United States Patent

[11] 3,539,209

[72] Inventor Shinji Takashima
   Fujisawa-shi, Japan
[21] Appl. No. 809,901
[22] Filed March 24, 1969
[45] Patented Nov. 10, 1970
[73] Assignee Miyata Industry Co. Ltd.
   Chigasaki-shi, Japan
   a corporation of Japan
[32] Priority Sept. 2, 1968
[33] Japan
[31] (utility model), 43/75,886

[54] HANDLE-STEM FOR A BICYCLE
   1 Claim, 3 Drawing Figs.
[52] U.S. Cl. ..................................................... 287/54
[51] Int. Cl. ..................................................... F16b 2/06
[50] Field of Search ........................................... 287/54(E)

[56] References Cited
   FOREIGN PATENTS
   22,060 9/1897 Great Britain ................ 287/54(E)
   21,905 10/1907 Great Britain ................ 287/54(E)

Primary Examiner—Kenneth Downey
Attorney—Karl W. Flocks

ABSTRACT: A handle-stem for a bicycle, including a substantially vertical and substantially horizontal integral sections, said horizontal section having adjacent its forward end a recessed upper wall portion of semicircular cross section and an arcuate lower wall portion extending along the lower surface of said recessed upper wall portion in close contact relationship therewith, said recessed upper wall portion being adapted to receive therein a handlebar at the intermediate portion thereof, said recessed upper wall portion and said arcuate lower wall portion having integral flanges extending forwardly therefrom, respectively, in laminated relationship with each other, said recessed upper wall portion being adapted to receive therein a handlebar at its intermediate portion, and a holding piece adapted to be applied over said handlebar intermediate portion and tightly fastened at one end against said laminated flanges and at the other end against the portion of said upper wall adjacent the rear edge of said recessed upper wall portion by means of bolts and nuts, whereby the handlebar may be rigidly mounted on said handle-stem.

Patented Nov. 10, 1970   3,539,209

INVENTOR
Shinji Takashima
BY Karen W. Flocks
ATTORNEY 3,539,209

HANDLE-STEM FOR A BICYCLE

BACKGROUND OF THE INVENTION

Field of the Invention

The present invention relates generally to a bicycle and, particularly, to a handle-stem for mounting a handlebar.

Conventional handle-stem has at the top a metallic block member through which a handlebar is mounted on the handle-stem. Such a metallic block member is manufactured by way of forging, casting or die-casting. In addition, the block member thus manufactured is welded to the top of the handle-stem. The welding involves troublesome after-treatments, such as heat-treatment, grinding and polishing. These procedures essentially increase the cost of manufacture of the bicycles.

SUMMARY OF THE INVENTION

It is, therefore, a primary object of the present invention to provide a handle-stem for a bicycle which handle-stem can be manufactured at considerably reduced cost of manufacture.

It is another object of the invention to provide a handle-stem for a bicycle, said handle-stem having a press-formed arcuate wall portion at the forward end thereof, said arcuate wall portion being adapted to receive therein a handlebar at its intermediate portion, and an arcuate holding member adapted to be positioned over said handlebar and fastened against said forward end of said handle-stem, whereby said handlebar may be rigidly mounted on said handle-stem.

It is still another object of the present invention to provide a handle-stem for a bicycle, said handle-stem including a substantially vertical and a substantially horizontal integral sections, said horizontal section having adjacent its forward end a recessed upper wall portion of substantially semicircular cross section and an arcuate lower wall portion extending in close contact relationship with said recessed upper wall portion, said recessed upper wall portion being adapted to receive therein a handlebar, said upper and lower wall portions having integral flanges extending forwardly therefrom, respectively, in laminated relationship with each other, and a holding member adapted to be applied over said handlebar and tightly fastened at one end against said laminated flanges and at the other end against the portion of said upper wall adjacent the rear edge of said recessed upper wall portion by means of bolts and nuts.

It is further object of the present invention to provide a handle-stem for a bicycle as set forth in the preceding object and in which there is provided a reinforcing member having a forward portion interposed between said recessed upper wall portion and said arcuate lower wall portion, said reinforcing member further having a rearward portion extending along and in close contact relationship with the inner surface of the radially outer wall of the bend of said handle-stem at which said vertical and horizontal sections are connected with each other.

Other objects and features of the present invention will be made apparent from the following description with reference to the accompanying drawings.

DESCRIPTION OF PREFERRED EMBODIMENTS

Figure 1:
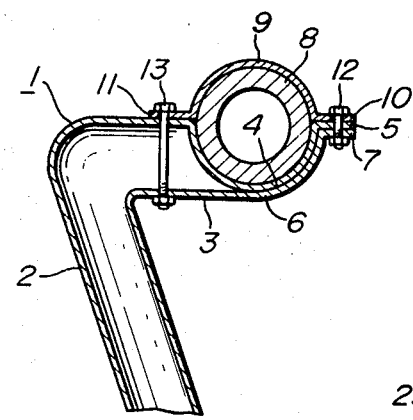
FIG. 1 is a sectional side view of a bicycle handle-stem embodying the present invention.
Figure 2:
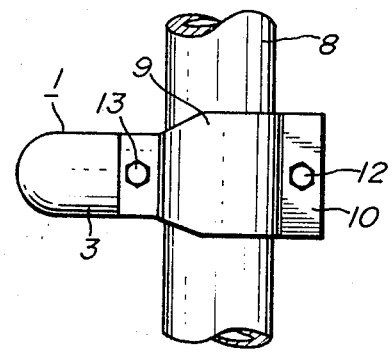
FIG. 2 is a top plan view of the handle-stem shown in FIG. 1.

Referring first to FIGS. 1 and 2, the bicycle handle-stem, generally indicated at numeral 1, includes a section 2 rearwardly inclined with respect to the vertical. The section 2 will hereunder be termed "vertical section" for the sake of convenience, though this section cannot exactly be called so because of the reasons above described. The handle-stem 1 further includes a substantially horizontal section 3 integral with the vertical section 3 and extending forwardly therefrom at the top thereof. The handle-stem 1 may conveniently and advantageously be manufactured by press-forming a linear metal tubing into the illustrated shape.

Terms for indicating or expressing directions, such as "rearward (rearwardly)", "forward (forwardly)" and "lateral (laterally)", are all used throughout the specification and the annexed claims in terms of the longitudinal axis of a bicycle utilizing the handle-stem according to the present invention. A bicycle incorporating the handle-stem of the present invention is designed to normally move rightwardly as viewed on the drawings. Thus, a term "forward" or "forwardly" in the specification and the annexed claims means rightward direction in the drawings.

The upper wall of the horizontal section 3 has an upwardly opening recess 4 of semicircular cross section and an integral flat flange 5 extending forwardly therefrom. The lower wall of the horizontal section 3 has an arcuate wall portion 6 in close contact relationship with substantially the forward half of the recessed upper wall portion 4. The arcuate wall portion 6 has an integral flat flange 7 which is in laminated relationship with the flange 5.

The recess 4 extends laterally with respect to the longitudinal axis of the horizontal section 3 so as to snugly receive therein a handlebar 8 at the intermediate portion between the ends thereof as will be seen from FIG. 2. An arcuate metallic holding member 9 is adapted to be applied over the handlebar 8. The holding member 9 has a forward flange 10 positioned over the laminated flanges 5 and 7 and a rear flange 11 positioned over the portion of the upper wall of the horizontal section 3 adjacent the rear edge of the recess 4. The holding member 9 is fastened at the flange 10 against the laminated flanges 5 and 7 and at the flange 11 against the upper wall of the horizontal section 3 by means of bolts and nuts 12 and 13, respectively, so as to snugly hold the handlebar in the recess 4.

The formation of the recess 4 and the flange 5 in the upper wall of the horizontal section 3 and of the arcuate portion 6 and the flange 7 in the lower wall in this section can be conveniently and advantageously accomplished by pressing the section 3 with a pair of appropriate dies. The holding member 9 can also be easily press-formed from a piece of metal. It would, therefore, be appreciated that the manufacture of the bicycle handle-stem according to the present invention necessitates no welding which would otherwise involve complicated and troublesome after-treatments, such as grinding and polishing operations, with the result that the present invention greatly reduces the cost of manufacture of bicycles.

Figure 3:
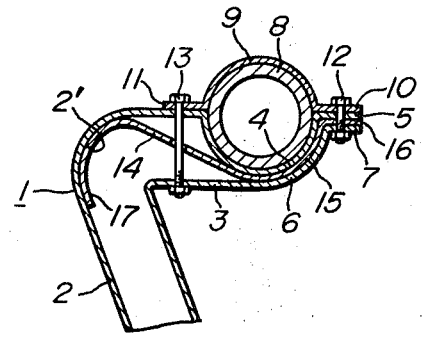
FIG. 3 is a sectional side view illustrating a modified embodiment of the present invention.

FIG. 3 shows a modification of the invention. This modification differs from the preceding embodiment only in that a reinforcing member 14 is provided within the horizontal section 3. The reinforcing member has an arcuate forward portion 15 interposed between the recessed upper wall portion 4 and the arcuate lower wall portion 6 of the horizontal section 3. The arcuate portion 15 has an integral flange 16 extending forwardly therefrom and positioned between the flange 5 of the recessed upper wall portion 4 and the flange 7 of the arcuate lower wall portion 5. The reinforcing member 14 extends from the nip of the recessed upper wall portion 4 and the arcuate lower wall portion 6 rearwardly and upwardly to the forward or upper end of a curved inner surface 2' of the radially outer wall portion of the bend of the handle-stem 1 and further extends substantially downwardly along the inner surface 2' in close contact relationship therewith.

The provision of the reinforcing member 14 in the handle-stem 1 may advantageously be carried out in a manner that a metallic piece is first positioned in a tubing adjacent one end thereof, said tubing being prepared to form a handle-stem 1. The tubing is then bent to provide a vertical section 2 and a horizontal section 3, so that the metallic piece in the tubing is also bent simultaneously. The section 3 is pressed adjacent one end thereof in the manner described in the above with said metallic piece being positioned in said one end, with the result that the metallic piece is press-formed to have an arcuate portion 15 and a flange 16 disposed between and in press-contact relationship with a recessed upper wall portion 4 and its flange 5 and an arcuate lower wall portion 6 and its flange 7, respectively.

The present invention has been described with reference to preferred embodiments. It is to be understood that the invention is not limited to the illustrated and described embodiments but may have various modifications and changes within the spirit and the scope of the invention defined in the annexed claims.

I claim:

1. A handle-stem for a bicycle, having a press-formed arcuate wall portion at the forward end thereof, said arcuate wall portion being adapted to receive therein a handlebar at its intermediate portion, and an arcuate holding member adapted to be positioned over said handlebar and fastened against said forward end of said handle-stem, whereby said handlebar may be rigidly mounted on said handle-stem, said handle-stem including a substantially vertical and a substantially horizontal integral section, said horizontal section having adjacent its forward end a recessed upper wall portion of substantially semicircular cross section and an arcuate lower wall portion extending in close contact relationship with said recessed upper wall portion, said upper and lower wall portions having integral flanges extending forwardly therefrom, respectively, in laminated relationship with each other, said holding member being adapted to be tightly fastened at one end against said laminated flanges and at the other end against the portion of said upper wall adjacent the rear edge of said recessed upper wall portion by means of bolts and nuts, said handle-stem including a reinforcing member having a forward portion interposed between said recessed upper wall portion and said arcuate lower wall portion, said reinforcing member further having a rearward portion extending along and in close contact relationship with the inner surface of the radially outer wall of the bend of said handle-stem at which said vertical and horizontal sections are connected with each other.